(12) United States Patent
Baek et al.

(10) Patent No.: US 8,653,945 B2
(45) Date of Patent: Feb. 18, 2014

(54) APPARATUS FOR MANAGING THE OPERATION OF A SHIP BLOCK

(75) Inventors: Tae Hyun Baek, Ulsan (KR); Seung Jin Ha, Ulsan (KR); Sang Hyup Lee, Ulsan (KR); Byeong Yeol Lee, Ulsan (KR); Hong Kyu Choi, Ulsan (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 74 days.

(21) Appl. No.: 13/392,108

(22) PCT Filed: Sep. 1, 2010

(86) PCT No.: PCT/KR2010/005921
§ 371 (c)(1),
(2), (4) Date: Feb. 24, 2012

(87) PCT Pub. No.: WO2011/031035
PCT Pub. Date: Mar. 17, 2011

(65) Prior Publication Data
US 2012/0176222 A1    Jul. 12, 2012

(30) Foreign Application Priority Data
Sep. 9, 2009    (KR) .................. 10-2009-0084760

(51) Int. Cl.
*H04Q 5/22*    (2006.01)
(52) U.S. Cl.
USPC ........................................ 340/10.1; 114/65
(58) Field of Classification Search
USPC ............................ 340/10.1; 114/335, 356, 65
See application file for complete search history.

(56) References Cited

U.S. PATENT DOCUMENTS

| | | | | |
|---|---|---|---|---|
| 3,747,189 A | * | 7/1973 | Kawasaki | 29/650 |
| 5,515,613 A | * | 5/1996 | Hinson | 33/288 |
| 5,965,860 A | * | 10/1999 | Oneda | 235/382 |
| 6,081,206 A | * | 6/2000 | Kielland | 340/937 |
| 6,330,523 B1 | * | 12/2001 | Kacyra et al. | 702/159 |
| 6,510,241 B1 | * | 1/2003 | Vaillant et al. | 382/154 |
| RE38,626 E | * | 10/2004 | Kielland | 340/937 |
| 8,059,864 B2 | * | 11/2011 | Huang et al. | 382/103 |
| 2002/0070862 A1 | * | 6/2002 | Francis et al. | 340/572.1 |

(Continued)

FOREIGN PATENT DOCUMENTS

| | | |
|---|---|---|
| KR | 10-2003-0085291 | 11/2003 |
| KR | 10-0587411 | 6/2006 |
| KR | 10-815714 | 3/2008 |
| KR | 10-0876424 | 12/2008 |

OTHER PUBLICATIONS

International Search Report dated Sep. 10, 2010 in counterpart International Application No. PCT/KR2010/005921.

*Primary Examiner* — Hai Phan
*Assistant Examiner* — Zhen Y Wu
(74) *Attorney, Agent, or Firm* — Ohlandt Greeley Ruggiero & Perle L.L.P.

(57) ABSTRACT

Provided is an apparatus for managing the operation of a ship block, including a ship block size and location measuring system, a transporter monitoring system, a block transportation monitoring system and a transportation lot number management system. The ship block size and location measuring system includes a direction angle sensor, a range finder, a radio frequency identification (RFID) reader and a control system, and the control system includes a block size and location measuring server, a vector calculating module, a coordinate calculating module, a size and location extracting module, and a memory module.

5 Claims, 4 Drawing Sheets

(56) References Cited

U.S. PATENT DOCUMENTS

| | | | |
|---|---|---|---|
| 2002/0197135 A1* | 12/2002 | Arntzen et al. | 414/140.3 |
| 2005/0128197 A1* | 6/2005 | Thrun et al. | 345/421 |
| 2005/0243085 A1* | 11/2005 | Schechter et al. | 345/419 |
| 2006/0058912 A1* | 3/2006 | Karlen | 700/214 |
| 2006/0075718 A1* | 4/2006 | Borne et al. | 52/745.02 |
| 2006/0210382 A1* | 9/2006 | Mountz et al. | 414/498 |
| 2008/0184630 A1* | 8/2008 | Rhodes et al. | 52/36.1 |
| 2009/0303079 A1* | 12/2009 | Khim | 340/932.2 |
| 2009/0327101 A1* | 12/2009 | Sayed | 705/27 |
| 2010/0293383 A1* | 11/2010 | Coughlin et al. | 713/176 |
| 2011/0083943 A1* | 4/2011 | Zhang et al. | 198/570 |
| 2011/0200420 A1* | 8/2011 | Driskill et al. | 414/807 |

* cited by examiner

APPARATUS FOR MANAGING THE OPERATION OF A SHIP BLOCK

BACKGROUND OF PRESENT DISCLOSURE

1. Field of Disclosure

The present disclosure relates to an apparatus for managing the operation of a ship block, and more particularly, to an apparatus for managing the operation of a ship block which may effectively allocate lot numbers of a block yard and effectively operates transporters by accurately measuring size and location of a ship block and monitoring operation statuses of the transporters in real time.

2. Related Art

In a general shipbuilding flow, a ship is built in the order of a designing process, a cutting and processing process, an assembling process, an outfitting process, a painting process, and an erecting process. In addition, since a ship has a large size, the cutting and processing process is generally performed in a block unit in consideration of workload, working conditions, working time or the like. The block means a unit size by which the ship is divided into a certain size.

Such blocks are carried in or out according to each process in a state of being piled up in a predetermined yard. And a carrying means, called a transporter, is used for carrying in or out the blocks. Meanwhile, the blocks of a ship have various shapes according to the ship location, and accordingly, the shape of a block should be considered for efficient operation of the yard and easy carrying of the block.

In an existing case, blocks are piled up in a yard and carried in or out without consideration of shape of the blocks, which results in deteriorated operating efficiency of the yard and bad transportation efficiency of the transporter which carries in or out the blocks.

In addition, when blocks are carried by using transporters, the information about locations of the transporters and weights of blocks are not transmitted to operators of the transporters in real time, which results in bad block transportation efficiency. Moreover, when blocks are carried in or out, lot numbers of the yard are not suitably allocated, and the transporters are not suitably operated. Therefore, the space utilization of the yard and the operating efficiency of the transporters are deteriorated.

SUMMARY OF THE DISCLOSURE

Technical Problem

The present disclosure is directed to provide a ship block management apparatus which may effectively allocate lot numbers of a block yard and effectively operates transporters by accurately measuring size and location of a ship block and monitoring operation statuses of the transporters in real time.

Technical Solution

In one general aspect, the present disclosure provides an apparatus for managing the operation of a ship block, including a ship block size and location measuring system, a transporter monitoring system, a block transportation monitoring system and a transportation lot number management system, wherein the ship block size and location measuring system includes a direction angle sensor, a range finder, RFID reader and a control system, wherein the control system includes a block size and location measuring server, a vector calculating module, a coordinate calculating module, a size and location extracting module and a memory module, wherein the direction angle sensor plays a role of measuring a direction angle of each edge of a block present at a specific location in a yard, the range finder plays a role of measuring a distance between a reference point and each edge of the block, and an RFID reader plays a role of recognizing locations of tags disposed at regular intervals in the yard where blocks are piled up, wherein the memory module plays a role of storing direction angle information of each edge of the block, measured by the direction angle sensor, and distance information between the reference point and each edge of the block, measured by the range finder, wherein the vector calculating module plays a role of calculating a vector value of the corresponding edge of the block by using the direction angle information and the distance information of a specific edge of the block, wherein the coordinate calculating module plays a role of calculating a coordinate of the specific edge of the block by using the location information of the tag and the vector value calculated by the vector calculating module, wherein the size and location extracting module calculates a distance between coordinates in a state where coordinates are set for all edges of the block by the coordinate calculating module, thereby extracting planar shape, size and location of the block of a polygonal shape.

The transporter monitoring system may include a weight sensor, a tilt angle sensor, an entry direction sensor, speed sensor and a transporter monitoring server, wherein the weight sensor may be provided at one side of a transporter and play a role of measuring weight of a block mounted on the transporter, the tilt angle sensor may play a role of measuring a tilt angle of the ground surface, the entry direction sensor may play a role of sensing an entry direction of the transporter, and the speed sensor may play a role of measuring a moving speed of the transporter, and the transporter monitoring server may play a role of transmitting all transporter information, measured by the sensors, to the transportation lot number management system.

The block transportation monitoring system may include a database (DB) block, a block moving path setting module, a block transportation plan setting module and a block transportation monitoring server, wherein the database (DB) block may include a lot number information database (DB) storing lot number information of the yard, a front/rear information database (DB) storing front/rear information, and a block arrangement database (DB) storing a block arrangement in the yard, wherein the block moving path setting module may play a role of setting a moving path of the block and a filing location of the block in the yard based on the lot number information, the block arrangement and the block size and location information measured by the ship block size and location measuring system, the block transportation plan setting module may play a role of setting transporter operating schedule and block carrying schedule based on the lot number information, the front/rear information, the block arrangement and the transporter information obtained by the transporter monitoring system, and the block transportation monitoring server may play a role of controlling the block moving path setting module and the block transportation plan setting module in linkage with the transportation lot number management system so that a block carrying-in and carrying-out process is controlled in real time.

The transportation lot number management system may collect the information generated by the ship block size and location measuring system, the transporter monitoring system, and the block transportation monitoring system and play a role of selectively providing the stored information according to the request of each system.

Advantageous Effects

The apparatus for managing the operation of a ship block according to the present disclosure gives the following effects.

Since the ship block size and location measuring system, the transporter monitoring system, the block transportation monitoring system and the transportation lot number management system work together, the utilization efficiency of the yard and the transportation efficiency of transporters may be improved.

DESCRIPTION OF DRAWINGS

The above and other objects, features and advantages of the present disclosure will become apparent from the following description of certain exemplary embodiments given in conjunction with the accompanying drawings, in which.

DETAIL DESCRIPTION OF THE DISCLOSURE

Figure 1:
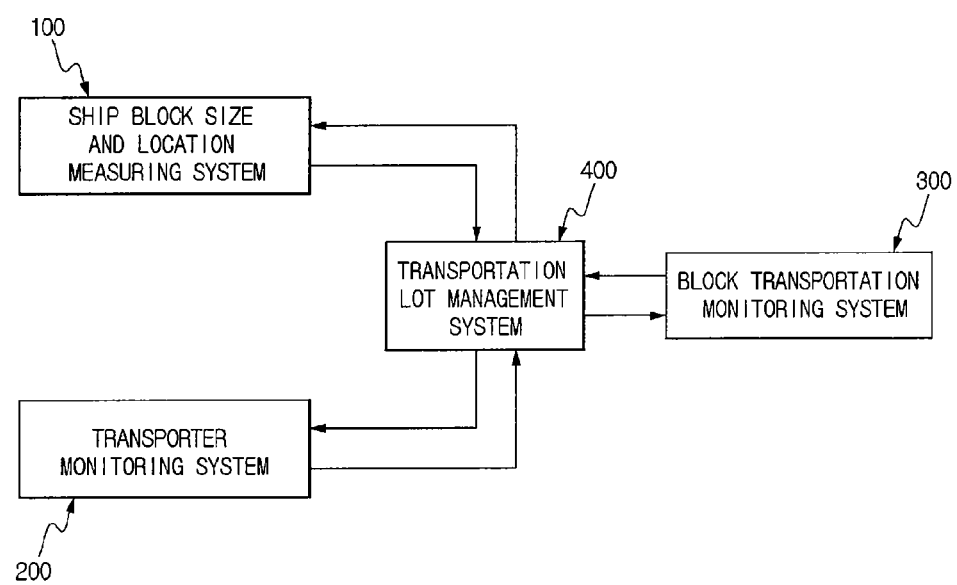
FIG. 1 is a block diagram showing an apparatus for managing the operation of a ship block according to an embodiment of the present disclosure.
Figure 2:
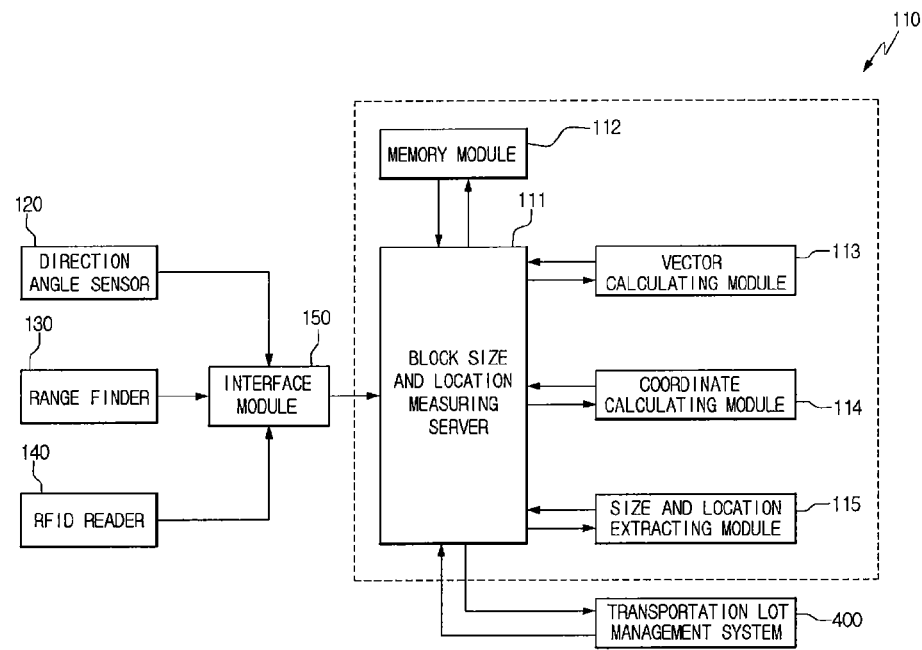
FIG. 2 is a block diagram showing a ship block size and location measuring system.
Figure 3:
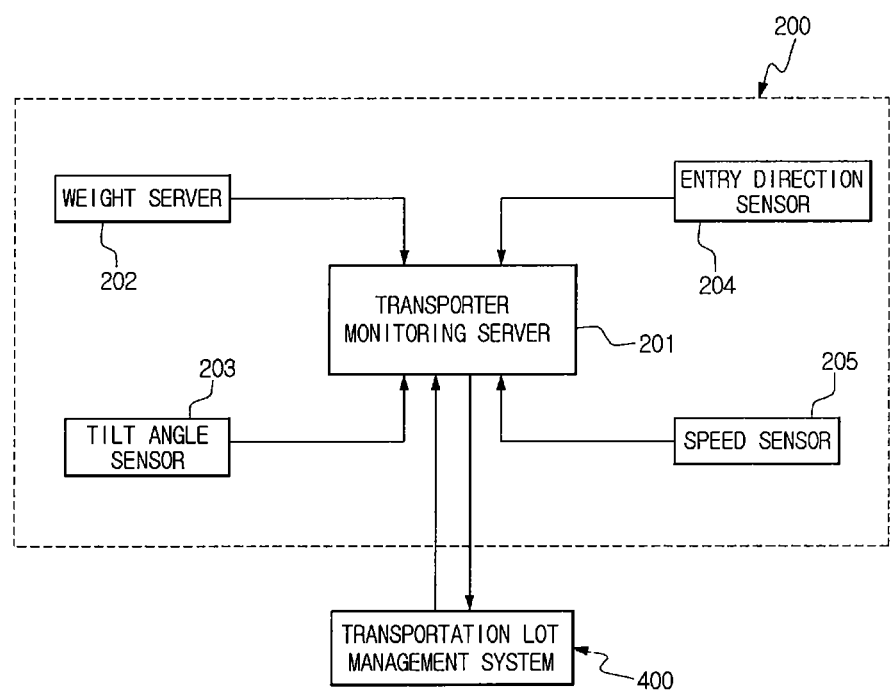
FIG. 3 is a block diagram showing a transporter monitoring system.
Figure 4:
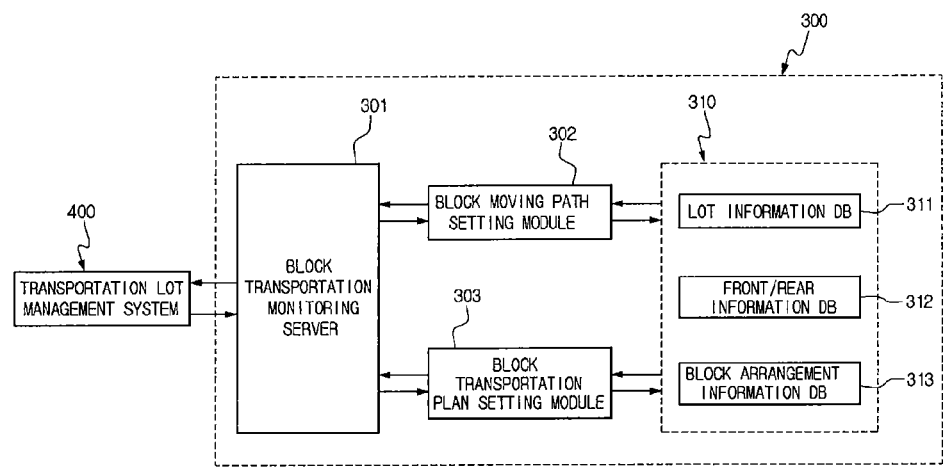
FIG. 4 is a block diagram showing a block transportation monitoring system.

Hereinafter, an apparatus for managing the operation of a ship block according to an embodiment of the present disclosure will be described in detail with reference to accompanying drawings. FIG. 1 is a block diagram showing an apparatus for managing the operation of a ship block according to an embodiment of the present disclosure, FIG. 2 is a block diagram showing a ship block size and location measuring system, FIG. 3 is a block diagram showing a transporter monitoring system, and FIG. 4 is a block diagram showing a block transportation monitoring system.

As shown in FIG. 1, an apparatus for managing the operation of a ship block according to the embodiment of the present disclosure generally includes a ship block size and location measuring system 100, a transporter monitoring system 200, a block transportation monitoring system 300 and a transportation lot number management system 400.

The ship block size and location measuring system is a system for measuring shape, size and location of each block piled up in a yard. The transporter monitoring system 200 is a system for monitoring weight information, tilt angle information, entry direction information, speed information or the like of a transporter which is means for carrying blocks. The block transportation monitoring system 300 is a system for setting an optimal block transportation plan and transporter operating plan. The transportation lot number management system 400 collects information generated by the ship block size and location measuring system 100, the transporter monitoring system 200, and the block transportation monitoring system 300 and plays a role of selectively providing the stored information according to the request of each system.

The ship block size and location measuring system 100, the transporter monitoring system 200, and the block transportation monitoring system 300 will be described in detail below. First, the ship block size and location measuring system 100 will be described.

The ship block size and location measuring system 100 includes a direction angle sensor 120, a range finder 130, a radio frequency identification (RFID) reader 140 and a control system 110, as shown in FIG. 2.

The direction angle sensor 120 plays a role of measuring a direction angle of each edge of a block present at a specific location in the yard, and transmitting the measured direction angle information to the control system 110. At this time, the direction angle of each edge of the block is measured based on a reference angle, and the reference angle is applied identically to every edge of all blocks. The reference angle may be arbitrarily set by a user, or for example, a magnetic north direction at a reference point may be set as the reference angle.

The range finder 130 plays a role of measuring a distance between the reference point and each edge of the block, and transmitting the measured distance information to the control system 110. In one embodiment, a laser range finder 130 may be used, and a distance between the reference point and the block edge may be measured through the time in which laser is irradiated to each edge of the block from the reference point and reflected thereto.

The RFID reader 140 plays a role of recognizing tags disposed at regular intervals in the yard, and transmitting the corresponding tag information to the control system 110. The tags disposed in the yard correspond to coordinates on a plane, and the reference point may also be one of a plurality of tags.

The control system 110 includes a block size and location measuring server 111, a vector calculating module 113, a coordinate calculating module 114, a size and location extracting module 115 and a memory module 112, in detail. The memory module 112 plays a role of storing the information measured by the direction angle sensor 120, the range finder 130 and the RFID reader 140. In detail, the memory module 112 stores direction angle information of each edge of the block, measured by the direction angle sensor 120, distance information between the reference point and each edge of the block, measured by the range finder 130, and location information of the tags disposed in the yard. At this time, the information measured by the direction angle sensor 120, the range finder 130 and the RFID reader 140 is received by the control system 110 by means of an interface module 150, and the corresponding received information is stored in the memory module 112 under the control of the block size and location measuring server 111.

Meanwhile, since blocks have various shapes, all edges of a block may not be observed at a specific location. In this case, the location where each edge of the block is measured may be changed. In other words, the direction angle and distance of all edges may not be measured at a single reference point, but they may be measured at a plurality of reference points. In this case, the direction angle information and the distance information need to be calibrated. For example, if the direction angle information and distance information of all edges of a block are measured at three reference points, one reference point is set as a main reference point among three reference points, and angle and distance of each of the other two reference points in comparison to the main reference point should be reflected on the direction angle information and distance information measured for the other two reference points, and the calibrated direction angle information and distance information are stored in the memory module 112.

The vector calculating module 113 calculates a vector value of each edge of the block based on the direction angle information and the distance information, and plays a role of calculating a vector value of the corresponding block edge by using the direction angle information of a specific edge of a block and the distance information of the corresponding edge (the distance between the reference point and the edge.

The coordinate calculating module 114 plays a role of calculating a coordinate of a specific block edge by using the location information of the tag and the vector value calculated by the vector calculating module 113. Coordinates of all edges of the block may be set through the coordinate calculating module 114.

The size and location extracting module 115 extracts a planar shape and size of a specific block in the yard. Specifically, in a state where the coordinates of all edges of a block are set by the coordinate calculating module 114, the shape and size extracting module 115 plays a role of calculating distances between the coordinates, namely distances between adjacent two coordinates, to extract a planar shape, size and location of the block of a polygonal shape.

The block size and location measuring server 111 plays a role of receiving the information input from the direction angle sensor 120, the range finder 130, and the RFID reader 140 and storing the received information in the memory module 112, and plays a role of generally controlling a vector calculating process, a coordinate calculating process and a shape, size and location extracting process in linkage with the vector calculating module 113, the coordinate calculating module 114, the size and location extracting module 115 and the memory module 112. In addition, the block size and location measuring server 111 plays a role of transmitting the calculated block size and location information to the transportation lot number management system 400.

The transporter monitoring system 200 includes a weight sensor 202, a tilt angle sensor 203, an entry direction sensor 204, a speed sensor 205 and a transporter monitoring server 201, as shown in FIG. 3. The weight sensor 202 is provided at one side of the transporter to play a role of measuring the weight of a block mounted on the transporter, and the tilt angle sensor 203 is used for measuring a tilt angle of the ground surface and is mounted to, for example, the upper portion of the transporter to indirectly measure a tilt angle of the ground surface. In addition, the entry direction sensor 204 plays a role of detecting an entry direction of the transporter, and the speed sensor 205 plays a role of measuring a moving speed of the transporter. Meanwhile, the information measured by the weight sensor 202, the tilt angle sensor 203, the entry direction sensor 204 and the speed sensor 205 are transmitted to the transporter monitoring server 201, and the transporter monitoring server 201 plays a role of transmitting all information measured by each sensor to the transportation lot number management system 400, and accordingly all information of the corresponding transporter may be managed in real time by the transportation lot number management system 400.

The block transportation monitoring system 300 includes a database (DB) block 310, a block moving path setting module 302, a block transportation plan setting module 303 and a block transportation monitoring server 301 as shown in FIG. 4. The database (DB) block 310 is configured to include a lot number information database (DB) 311 storing lot number information of the yard, a front/rear information database (DB) 312 storing front/rear information, and a block arrangement database (DB) 313 storing an block arrangement in the yard, and the database (DB) block 310 may be included in the transportation lot number management system 400.

The block moving path setting module 302 plays a role of setting a moving path of the block and a piling location of the block in the yard based on the lot number information, the block arrangement and the block size and location information measured by the ship block size and location measuring system. The block transportation plan setting module 303 plays a role of setting transporter operating schedule and block carrying schedule based on the lot number information, the front/rear information, the block arrangement and the transporter information obtained by the transporter monitoring system 200. The block transportation monitoring server 301 is linked with the transportation lot number management system 400 and controls the block moving path setting module 302 and the block transportation plan setting module 303 to control a block carrying-in and carrying-out process in real time.

INDUSTRIAL APPLICABILITY

The utilization efficiency of a yard and the transportation efficiency of transporters may be improved by linking the ship block size and location measuring system, the transporter monitoring system, the block transportation monitoring system and the transportation lot number management system.

The invention claimed is:

1. An apparatus for managing the operation of a ship block, comprising: a ship block size and location measuring system, a transporter monitoring system, a block transportation monitoring system and a transportation lot number management system, wherein the ship block size and location measuring system includes a direction angle sensor, a range finder, a radio frequency identification (RFID) reader and a control system, wherein the control system includes a block size and location measuring server, a vector calculating module, a coordinate calculating module, a size and location extracting module and a memory module, wherein the direction angle sensor plays a role of measuring a direction angle of each edge of a block present at a specific location in a yard, the range finder plays a role of measuring a distance between a reference point and each edge of the block, and an RFID reader plays a role of recognizing locations of tags disposed at regular intervals in the yard where blocks are piled up, wherein the memory module plays a role of storing direction angle information of each edge of the block, measured by the direction angle sensor, and distance information between the reference point and each edge of the block, measured by the range finder, wherein the vector calculating module plays a role of calculating a vector value of the corresponding edge of the block by using the direction angle information and the distance information of a specific edge of the block, wherein the coordinate calculating module plays a role of calculating a coordinate of the specific edge of the block by using the location information of the tag and the vector value calculated by the vector calculating module, wherein the size and location extracting module calculates a distance between coordinates in a state where coordinates are set for all edges of the block by the coordinate calculating module, thereby extracting planar shape, size and location of the block of a polygonal shape.

2. The apparatus for managing the operation of a ship block according to claim 1, wherein the transporter monitoring system includes a weight sensor, a tilt angle sensor, an entry direction sensor, speed sensor and a transporter monitoring server, wherein the weight sensor is provided at one side of a transporter and plays a role of measuring weight of a block mounted on the transporter, the tilt angle sensor plays a role of measuring a tilt angle of the ground surface, the entry direction sensor plays a role of sensing an entry direction of the transporter, and the speed sensor plays a role of measuring a moving speed of the transporter, and wherein the transporter monitoring server plays a role of transmitting all transporter information, measured by the sensors, to the transportation lot number management system.

3. The apparatus for managing the operation of a ship block according to claim 1, wherein the block transportation monitoring system includes a database block, a block moving path setting module, a block transportation plan setting module and a block transportation monitoring server, wherein the database block includes a lot number information database storing lot number information of the yard, a front/rear information database storing front/rear information, and a block arrangement database storing a block arrangement in the yard, wherein the block moving path setting module plays a role of setting a moving path of the block and a filing location of the block in the yard based on the lot number information, the block arrangement and the block size and location information measured by the ship block size and location measuring system, wherein the block transportation plan setting module plays a role of setting transporter operating schedule and block carrying schedule based on the lot number information, the front/rear information, the block arrangement and the transporter information obtained by the transporter monitoring system, wherein the block transportation monitoring server plays a role of controlling the block moving path setting module and the block transportation plan setting module in linkage with the transportation lot number management system so that a block carrying-in and carrying-out process is controlled in real time.

4. The apparatus for managing the operation of a ship block according to claim 3, wherein the database block is provided in the transportation lot number management system.

5. The apparatus for managing the operation of a ship block according to claim 1, wherein the transportation lot number management system collects the information generated by the ship block size and location measuring system, the transporter monitoring system, and the block transportation monitoring system and plays a role of selectively providing the stored information according to the request of each system.

* * * * *